United States Patent [19]
Martin

[11] 3,979,148
[45] Sept. 7, 1976

[54] WINDOW FRAME APPARATUS FOR VEHICLES

[76] Inventor: Wayne Martin, 2301 McCart Ave., La Habra, Calif. 90631

[22] Filed: June 12, 1975

[21] Appl. No.: 586,158

[52] U.S. Cl. .............................. 296/137 B; 16/172; 49/141; 98/2.14
[51] Int. Cl.² ........................................... B60J 7/08
[58] Field of Search .................. 296/137 B, 137 R; 49/141, 465; 16/149, 172; 98/2.14

[56] References Cited
UNITED STATES PATENTS

| | | | |
|---|---|---|---|
| 697,020 | 4/1902 | Rowland | 16/172 |
| 2,173,890 | 9/1939 | Tuttle | 296/137 X |
| 2,372,164 | 3/1945 | Woodhams | 98/2.14 |
| 2,517,303 | 8/1950 | Green | 98/2.14 |
| 2,602,956 | 7/1952 | Reynolds | 16/172 |
| 2,845,016 | 7/1958 | Steege | 98/2.14 |
| 3,861,083 | 1/1975 | Goiot | 49/465 X |

*Primary Examiner*—Robert J. Spar
*Assistant Examiner*—Donald W. Underwood
*Attorney, Agent, or Firm*—Francis X. LoJacono

[57] ABSTRACT

A window frame apparatus for vehicles wherein the apparatus is generally positioned on the roof of the vehicle, thus permitting light to enter from the top of the vehicle, and in addition allowing ventilation to atmosphere when the window portion is opened or removed therefrom, the window portion being removable from the frame structure by means of detachable hinges and adjusting arms.

4 Claims, 6 Drawing Figures

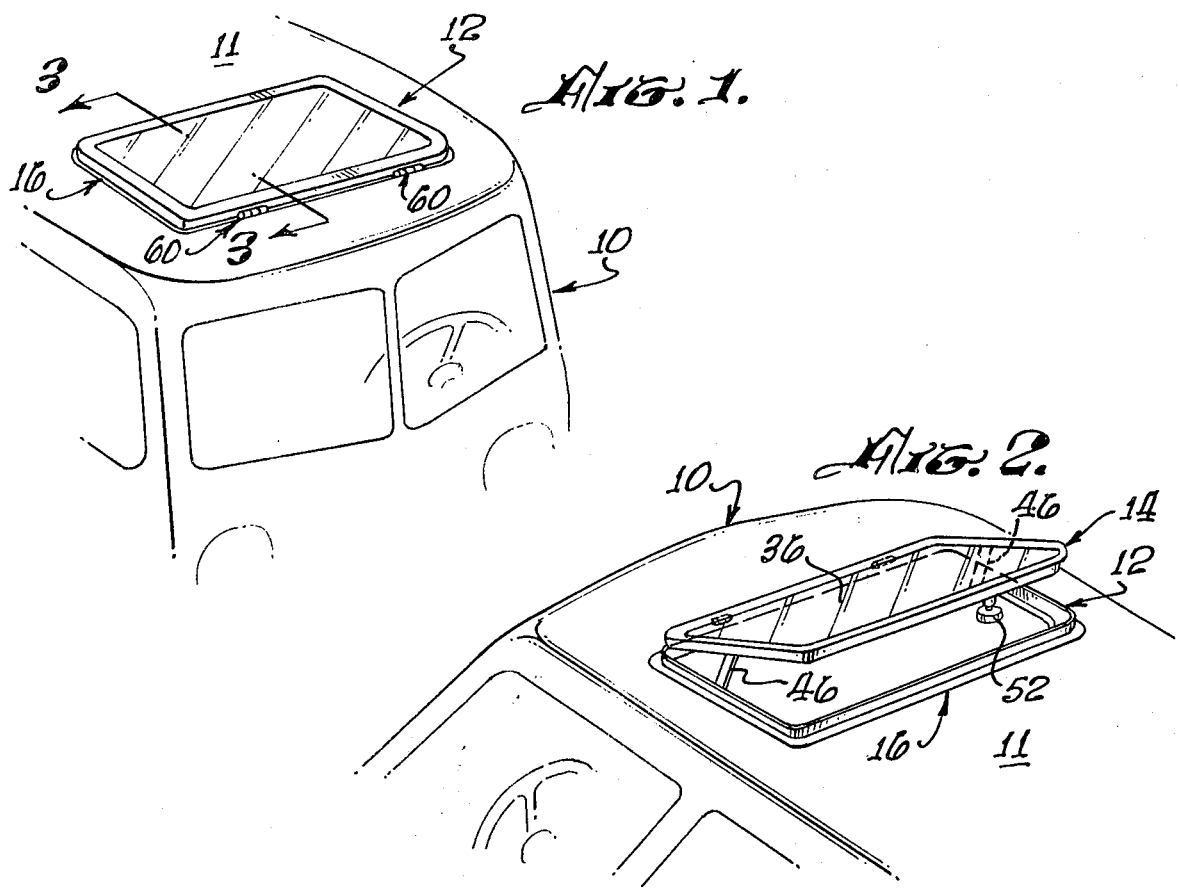
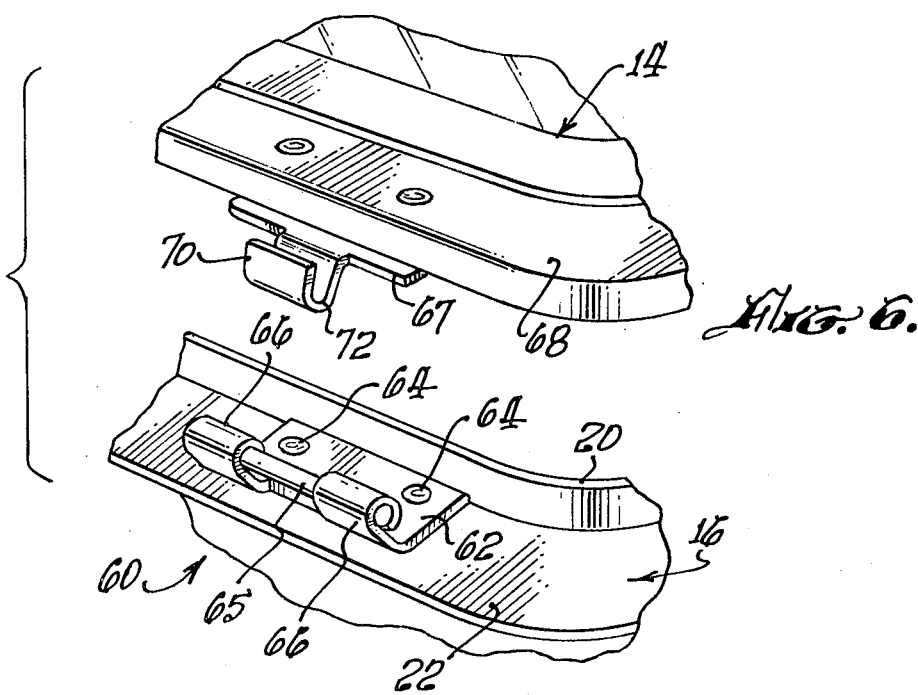

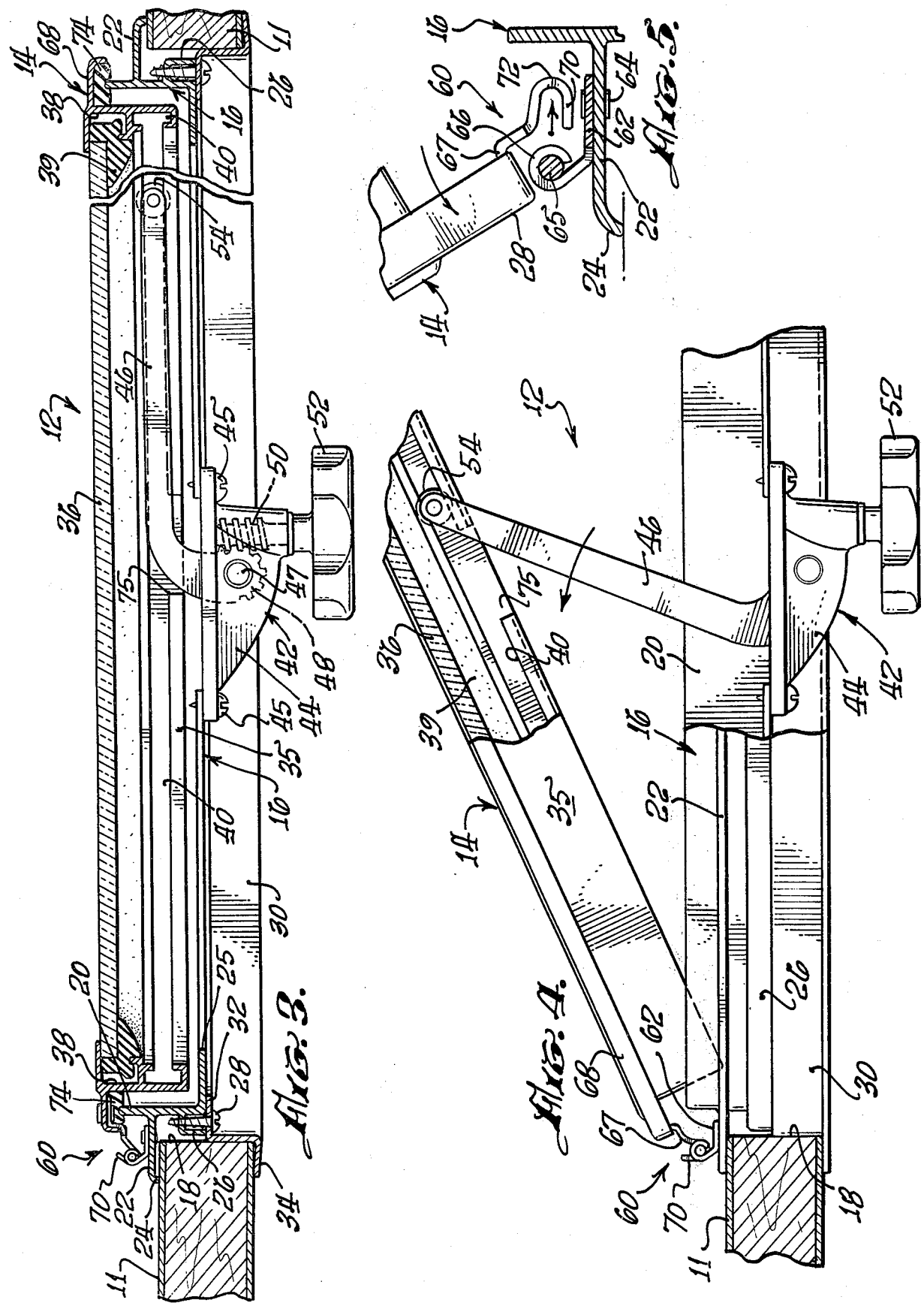

WINDOW FRAME APPARATUS FOR VEHICLES

BACKGROUND

1. Field of the Invention

This invention relates to window frames and structures therefor and, more particularly, to a window frame apparatus that is capable of being mounted in the roof of a vehicle.

2. Description of the Prior Art

As is well known in the art, various types of window apparatuses are presently available. However, many problems and difficulties are encountered in providing a window or an adjustable opening in the roofs of vehicles, especially the type of vehicles known as vans and panel trucks.

The industry has for a long time been seeking a window unit that can be installed in the roof of a van-type vehicle, particularly with respect to the recreational type, wherein the unit projects upwardly at a very low height from the roof line and yet combines other important features.

These features are a window unit that is capable of being adjustable to selective openings and in addition, when desired, capable of allowing the window frame to be completely removed from the frame structure affixed to the roof of the van.

To the applicant's knowledge, there is no window unit capable of being totally removed and replaced at will without the need of various hardware tools.

SUMMARY

This invention provides a window unit designed for vehicles, such as vans, enclosed trucks, and recreational vehicles; and it is also contemplated that the use thereof will be extended to boats and the like. The present invention comprises a window frame structure that is mounted in an opening formed in the roof of a vehicle, preferably a van-type. The frame is so designed to provide a very low protuberance above the roof line.

Removably received within the frame structure opening is a window-and-frame unit, the unit being pivotally connected along one edge thereof. This pivot means used in the apparatus are hinges formed to be disconnected when the window unit is raised to a selected point. That is, the frame structure is provided with a pair of hand-operated lever means having lever arms movably received within the window frame unit. When these levers are operated, the windows can be either opened or closed. Accordingly, there is included in the window frame unit a means by which the lever arms can be readily disengaged therefrom. Thus, the window is free to be removed from the disengagable hinges, leaving a clear enlarged opening through the roof of the vehicle.

By simply reconnecting the hinges and once again engaging the lever arms in their respective sides of the window frame unit, the window is readily adjusted back to a closed mode by the hand-operated lever means.

OBJECTS AND ADVANTAGES OF THE INVENTION

The present invention has for an important object a provision whereby a window unit of a window frame apparatus adapted for installation in vehicles can be readily removed from the frame structure thereof, thus providing a clear, free opening in the roof of the vehicle.

It is another object of the invention to provide a window frame apparatus for vehicles wherein the hinge means are capable of being disconnected for simple removal of the window unit.

It is still another object of the invention to provide a window frame apparatus for vehicles wherein the apparatus is designed to be installed in the roof of van-type vehicles, whereby light and ventilation can be easily controlled.

It is a further object of the invention to provide an apparatus of this character that is simple and rugged in construction.

A still further object of the invention is to provide an apparatus of this character having a relatively long working life.

It is still another object of the invention to provide an apparatus of this character that is easy to service and maintain.

It is a further object of the invention to provide an apparatus of this character that is relatively inexpensive to manufacture.

The characteristics and advantages of the invention are further sufficiently referred to in connection with the accompanying drawings, which represent one embodiment. After considering this example, skilled persons will understand that variations may be made without departing from the principles disclosed and I contemplate the employment of any structures, arrangements or mode of operation that are properly within the scope of the appended claims.

DESCRIPTION OF THE DRAWINGS

Referring more particularly to the accompanying drawings, which are for illustrative purposes only:

FIG. 1 is a pictorial view of a portion of a van-type vehicle wherein the window frame apparatus is installed in the roof thereof in a closed mode;

FIG. 2 is a similar view to that of FIG. 1, wherein the apparatus is shown in an open mode;

FIG. 3 is an enlarged cross-sectional view taken substantially along line 3—3 of FIG. 1;

FIG. 4 is a partial view of the present invention having portions thereof broken away to show various operating elements therein;

FIG. 5 is an enlarged view of the hinge means being disconnected, thereby allowing the window unit to be removed from the frame structure; and FIG. 6 is an exploded view showing the separation of the two frames and the hinge means.

DESCRIPTION OF THE PREFERRED EMBODIMENT

Referring more particularly to the drawing, there is illustrated in FIGS. 1 and 2 the front end of a vehicle, generally indicated at 10. The vehicle 10 is shown as the van-type which is often used as a recreational vehicle. While traveling in such vehicles ventilation problems sometimes occur; and, therefore, there is a need for outside air to enter the vehicle.

Thus, a simple, but effective window frame apparatus, generally designated at 12, is arranged to be positioned in the roof 11 of the vehicle 10. In FIG. 1, the window unit 14 of the apparatus is shown in a closed mode, while in FIG. 2 the window unit 14 is shown in one of many selective, opened positions.

The window frame apparatus comprises a casement frame 16 which is adapted to be fixedly mounted to the roof 11, wherein the roof is provided with an aperture 18 in which said casement is directly received therein, as seen in FIG. 3.

It should be understood that said aperture 18 can be located at any desired point along the roof 11 and is shown in the perfered location, which is the area adjacent the front end of the vehicle 10, with the hinged portion of the window facing rearwardly thereof.

Again referring to the casement 16, there are shown various elements which comprise the overall structure 16. Said casement includes a main frame structure formed to fit the rectangular aperture 18, said main frame having a vertical peripheral wall 20 from which a peripheral flange 22 extends outwardly therefrom. A depending lip 24 is provided along the free edge of the flange 22 whereby direct engagement is made with the outer wall of the roof 11. Said vertical wall 20 terminates by an inwardly turned wall 25, whereby the vertical wall 20 and the horizontal wall 25 form a substantially L-shaped configuration.

Oppositely disposed to the wall 25 is an inverted channel 26 that is formed as an integral part of the main structure 16. The channel is used to receive fastening means, such as screws 28, by which a jamb member 30 is secured to the main frame structure 16. The jamb 30 is provided with an S-shaped cross-sectional configuration wherein the upper horizontal rib member 32 abuts against channel 26, said screw 28 passing therethrough into channel 26, thereby securing the jamb in place relative the roof 11. Accordingly, the lower rib member 34 abuts the underside of the roof 11, as seen in FIGS. 3 and 4, wherein the entire casement 16 is held in place.

Removably attached to said casement 16 is the window unit 14 which comprises a window frame structure 35, said window frame being adapted to be received in the opening created by the casement 16; i.e., the window frame has a small overall size. Secured within the window frame 35 is a glass window panel 36 which is mounted therein in a well-known suitable manner, as shown in FIG. 3. Thus, the frame 35 is formed with an upper, inner peripheral channel 38 in which the glass 36 and the typical seal 39 are received therein. Juxtapositioned to said channel 38 is an annular groove or track 40 forming a part of a means by which the window is operated between an open and closed mode of operation.

Hence, there is provided an operating means, generally indicated at 42, which allows not only for the window to be opened or closed, but in addition allows for the separation of the window frame 14 and the casement 16. Means 42 comprises a pair of hand-operated levers oppositely disposed on each side of the structure, wherein the levers include a housing 44 mounted to the lower wall 25 of the casement 16 by screws 45.

Extending outwardly from the housing 44 is a lever arm 46 having one end pivotally attached in housing 44 at 47, wherein said end is provided with gear teeth 48. Said teeth 48 engage a worm drive 50 which is operated by handle 52 (see FIG. 3). As seen in FIG. 3, the lever is in a substantially horizontal position parallel to the track 40 in which a roller 54 is received, said roller being rotatably mounted to the free end of the lever arm 46. Thus, as handle 52 is rotated, the lever arm 46 is also rotated about point 47, forcing the window to move upwardly as the roller traverses the track 40, as seen in FIG. 4. It can, therefore, be seen that the window unit is capable of being adjusted for various opening modes.

However, as an important feature of the present invention, the window unit 14 is hingedly connected to the casement 16 by hinge means, indicated generally at 60. This provides a complete separation of the window unit 14 from the fixed window casement 16, as seen in FIGS. 5 and 6, thereby permitting the vehicle to have an unobstructed opening to the ventilation of the interior of the vehicle.

Accordingly, the hinge means 60 comprises a first hinge member 62 affixed to flange 22 of the casement 16 by suitable means, such as rivets 64. Said hinge member 62 includes a pin 65 held in a fixed position to member 62 by hinge fingers 66. The second hinge member 67 of said hinge means 60 is affixed to an annular flange 68 of the window frame unit 14. Said member 67 includes a tongue 70 which is bent back on itself, providing a loop 72. This loop is releasably engaged with pin 65 when the window is closed and during the operation thereof. However, when said window unit is to be separated from the casement 16, each lever arm is raised to a point adjacent the open slot 75 disposed in the track 40, whereby said roller 54 of said lever arm 46 is disengaged from track 40. At this time, the window unit is swung back to a point shown in FIG. 5 --- thus allowing lip 70 to separate from pin 65. When it is necessary to replace the window unit, the reverse operation takes place.

The handles 52 are rotated, bringing the unit 14 into complete sealing contact with the casement. To provide a positive seal therebetween, there is included a sealing gasket 74 attached to flange 68 of the window unit 14, said gasket engaging the annular, upper edge of wall 20.

The invention and its attendant advantages will be understood from the foregoing description and it will be apparent that various changes may be made in the form, construction and arrangement of the parts of the invention without departing from the spirit and scope thereof or sacrificing its material advantages, the arrangement herein before described being merely by way of example, and I do not wish to be restricted to the specific form shown or uses mentioned, except as defined in the accompanying claims.

I claim:

1. A window frame apparatus for use in a vehicle, comprising:
    a window casement fixedly secured in an aperture disposed in said vehicle;
    a window unit operably connected to said casement having a glass panel mounted therein, said unit including an inner peripheral track;
    a hinge means releasably connecting said window unit to said window casement along one side thereof, wherein said hinge means comprises:
    a first hinge member fixedly secured to said window casement, said member having a pivot pin mounted thereto;
    a second hinge member fixedly secured to said window unit, said second hinge member having a tongue member adapted for releasable engagement with said pivot pin of said first member;
    an operably lever means secured to said fixed window casement and being operably engaged with said track means for disengaging said lever means therefrom, whereby said hinge means can be separated to allow said window unit to be disengaged from said window casement, wherein said operable lever means comprises:

a housing fixedly secured to said window casement;
an adjustable lever arm having one free end and the opposite end thereof pivotally mounted in said housing;
a roller attached to said free end of said arm and removably received in said track of said window unit;
gear means disposed in said housing and operably connected to the pivotal end of said lever arm; and
disengaging means disposed in said track comprising a slot positioned in said track whereby said roller of said lever means can be disengaged from said track when said window unit is raised to a predetermined point.

2. A window frame apparatus as recited in claim 1, wherein said vehicle aperture is disposed in the roof of said vehicle and wherein said window casement disposed therein comprises:

a vertical wall;
an outwardly extending flange member for direct mounting contact with said outer portion of said roof; and
a jamb member secured to said casement and arranged for direct contact with said inner portion of said roof, thereby fixedly mounting said casement in said roof of said vehicle.

3. A window frame apparatus as recited in claim 2, wherein said operating lever means includes a handle to operate said gear means.

4. A window frame apparatus as recited in claim 3, wherein said second hinge member is connected to an annular flange integrally formed as part of said window unit and wherein a sealing gasket is disposed about said flange for sealing engagement with said window casement.

* * * * *